United States Patent Office 3,567,701
Patented Mar. 2, 1971

3,567,701
PROCESS FOR PREPARING POLYOLEFINS
Karl Diether Keil, Frankfurt am Main, Germany, assignor to Farbwerke Hoechst Aktiengesellschaft vormals Meister Lucius & Bruning, Frankfurt am Main, Germany
No Drawing. Filed May 1, 1968, Ser. No. 725,912
Claims priority, application Germany, May 20, 1967, F 52,468
Int. Cl. C08f *1/42, 3/06*
U.S. Cl. 260—88.2                              1 Claim

---

ABSTRACT OF THE DISCLOSURE

The present invention relates to a process for the polymerization of ethylene or mixtures of ethylene with up to 10% by weight of higher α-olefins in the presence of a mixed catalyst composed of a trivalent chlorine-containing titanium compound and an aluminium-organic component obtained by reacting acetylenes with aluminum hydrocarbons.

---

The present invention provides a process for polymerizing ethylene and mixtures of ethylene with higher α-olefins.

When the polymerization of olefins by the low pressure process is carried out in the presence of catalysts consisting of a small amount of a titanium compound and an excess of a chlorine-free aluminium-organic compound, and hydrogen as a molecular weight controlling agent, the polymerization rate of the olefin decisively depends on the type of the aluminium organyl.

The use of polymeric aluminium-organic compounds as catalyst components is generally expensive since, in many cases, these compounds are not easily obtainable. Belgian Pat. No. 601,855 discloses the preparation of aluminium isoprenyl.

From German Pats. Nos. 1,052,987 and 1,044,082 as well as from Liebigs Annalen, vol. 629, page 222 (1960) it is known that addition products can be prepared from saturated aluminium hydrocarbons and acetylene or acetylene derivatives and the corresponding unsaturated compounds may be reacted or subjected to a thermal treatment with further aluminium hydrocarbons to yield viscous aluminium compounds from dialkyl-aluminium alkenyls in a number of polyadditions or re-splitting reactions and rearrangements.

I have now found that aluminium compounds of this type in combination with chlorine-containing titanium compounds are excellently suitable for the polymerization of ethylene and the mixtures thereof with up to 10% by weight of higher α-olefins in solution, suspension or in the gaseous phase at temperatures in the range of from 20° to 250° C., preferably from 60° to 130° C., under a pressure of from 0 to 10 atmospheres gage, preferably from 2 to 6 atmospheres gage, in the presence of a mixed catalyst consisting of a trivalent chlorine-containing titanium compound in a concentration of from 0.03 to 0.5 millimol per liter of dispersing agent or per 0.5 liter of reactor volume and an aluminium-organic component in a concentration of from 0.01 to 3 millimols of aluminium per liter of dispersing agent or reactor volume, while controlling the medium molecular weight by hydrogen, which polymerization process comprises carrying out the polymerization in the presence of a mixed catalyst, the aluminium-organic component of which has been prepared by reacting acetylene or acetylene derivatives with aluminium hydrocarbons whose organyl radicals contain from 1 to 10, preferably 3 to 6, carbon atoms.

The technical advance of the process of the invention resides in the fact that components that can very easily be obtained in industry, such as lower aluminium alkyls, for example aluminium triisobutyl, and acetylene can be used, without an expensive elimination of the catalyst, for preparing polyolefins having a narrow molecular weight range suitable for further processing the polyolefins.

As aluminium-organic compounds which are prepared in known manner, there are suitable, for example, reaction products of acetylene compounds, such as acetylene, with dialkyl-aluminium hydrides, for example diisobutyl-aluminium hydride, as well as with aluminium trialkyls, for example aluminium triisobutyl.

Preferably suitable for the process of the invention are the dialkyl-aluminium alkenyls which can be prepared with acetylene and which correspond to the formula $R_2Al$—$CH$=$CH$—$R$ in which R represents hydrocarbon radicals having from 2 to 10 carbon atoms.

Reaction products which can be prepared from these reaction products of acetylene by a thermal treatment at temperatures in the range of from 60 to 200° C., preferably from 140 to 180° C., are especially effective. A number of addition-, rearrangement- and re-splitting steps of an exothermic reaction yield, for example, polymeric aluminium organyls which, according to the process of the invention, have a particular activating effect. This effect consists in obtaining a polymer which has the lowest possible molecular weight and a reduced specific viscosity in the range of from about 1.3 to 2.5 and which is suitable for injection molding, with a high catalyst yield and the lowest possible hydrogen feed during the polymerization of the olefins.

The special suitability of the aluminium compounds claimed can be seen from Table 1: The homopolymerization of ethylene was carried out under strictly comparable test conditions so that the molecular weights can be calculated from the $i_5$-values. While aluminium trialkyls having relatively small alkyl groups, such as aluminium triisobutyl (a), yield a polymer having a high molecular weight, the molecular weight considerably decreases under constant polymerization conditions when diisobutyl-aluminium isohexenyl (b) and its reaction products (c) resulting from the thermal treatment, are used. When higher aluminium alkyls are used as starting products, the aforesaid effect is somewhat less pronounced since higher aluminium trialkyls, such as aluminium tridecyl (g), already provide a polymer having a relatively low molecular weight, in a comparable catalyst yield.

Furthermore suitable as aluminium-organic activators are the reaction products of dialkyl-aluminium alkenyls with aluminium trialkyls or dialkyl-aluminium hydrides. The dialkyl-aluminium alkinyls which can be prepared from dialkyl-aluminium halides and light metal acetylides in inert hydrocarbons and which correspond to the formula $R_2Al$—$C$≡$C$—$R'$ in which R and R' each represents a hydrocarbon radical having from 1 to 10, preferably from 3 to 6, carbon atoms, as well as the reaction products thereof with aluminium trialkyls or dialkyl-aluminium hydrides are also suitable activators.

The aluminium compounds that do not come within this invention, are prepared either in substance or rather in dilution with inert dispersing agents. Small amounts of cuprene which have formed are filtered off prior to the use as polymerization catalyst. A slight color of the crude metallo-organic compounds, which may be present in some cases, especially in the compounds of the polymeric type, can be neglected since the proportions of the aluminium components used with regard to the amount of polymer obtained, are small and, moreover, they do not remain entirely in the polymer in the case of a solution- or suspension polymerization.

For the polymerization of ethylene or mixtures of ethylene with up to 10% by weight of higher α-olefins, preferably propylene or butene-1, the aluminium compounds are used in amounts in the range of from 0.01 to 3 millimols of aluminium per liter of dispersing agent or per liter of reactor volume, depending on the purity of the dispersing agent or solvent and of the olefins to be reacted. The higher the content of minor impurities, for example water, oxygen or $CO_2$, the larger the amount of aluminium compound required which, however, does in no case exceed an amount that leads to an ash content of more than 300 p.p.m. If necessary, the olefins and the dispersing agent or solvent have to be purified by known methods. As dispersing agents and solvents the inert hydrocarbons commonly used for Ziegler-polymerizations are employed.

The titanium compounds used are trivalent chlorine-containing titanium compounds, such as titanium chloride or titanium alkoxy-chloride, which are prepared by a reduction of titanium tetrachloride or chloro-alkoxy-titanate of the formula $Ti(OR)_{4-n}Cl_n$ in which $n$ is an integer of from 1 to 4 and R represents hydrocarbon radicals having from 2 to 8 carbon atoms, by means of aluminium-organic compounds, for example alkyl-aluminium sesquichloride, dialkyl-aluminium monochloride, aluminium trialkyls or aluminium polymers, for example aluminium isoprenyl. Especially suitable for the reduction of the tetravalent titanium compounds are also the compounds resulting from aluminium organyls and acetylene compounds, for example diisobutyl-aluminium isohexenyl subjected to a thermal treatment at 150° C. The tetravalent titanium compounds are reduced at temperatures in the range of from −60 to +70° C., preferably from −30° to 0° C., the molar ratio of aluminium compound to titanium compound being in the range of from 0.3 to 1.5. If desired, the reaction product may then be subjected to a thermal treatment at a temperature in the range of from 60° to 150° C. and, if desired, it may also be washed with an inert dispersing agent. It is advantageous to wash the product that has been reduced with chlorine-containing aluminium organyls; the product is, however, advantageously not washed when it has been reduced with chlorine-free aluminium compounds. In the latter case, the $TiCl_3$-catalyst contains aluminium chloride. Depending on the hydrogen content in the gaseous phase, which controls the molecular weight, and on the amount of impurities in the polymerization components, the concentration of the titanium compound is in the range of from 0.03 to 0.5 millimol per liter of dispersing agent or per 0.5 liter of reactor volume.

The polymerization is carried out under a pressure in the range of from 0 to 20 atmospheres gage, preferably from 2 to 10 atmospheres gage, whereupon, in any case, catalyst yields of at least 1 kilogram of polymer per 1 millimol of $TiCl_3$ are obtained. The polymers obtained are worked up after having been cooled or precipitated (in a solution polymerization) by simply filtering and drying them. The ash content and the corrosion of the polymers are so low that they can be neglected in the further processing. The products do not show a change in color.

The following examples serve to illustrate the invention, but they are not intended to limit it thereto.

EXAMPLE 1

Preparation and thermal treatment of diisobutyl-aluminium isohexenyl 198 grams (1 mol) of aluminium triisobutyl diluted with 790 milliliters of a diesel oil fraction boiling from 150° to 160° C., were introduced into a three-necked flask having a capacity of 1 liter, provided with a stirrer, a gas inlet pipe and a Dry-Ice reflux condenser. While vigorously stirring, acetylene purified with aluminium organyl was introduced at 35° C. in such an amount that practically no waste gas escaped over the Dry-Ice condenser. At the Dry-Ice condenser, a small amount of isobutylene was condensed. The reaction was maintained for 9 hours at 35° C. by gently cooling, whereupon 25 grams of acetylene were absorbed (conversion rate 96%). A light yellow solution was filtered off from the slight amount of cuprene that had formed; prior to the use as a polymerization activator, unreacted acetylene which was still dissolved in the solution was eliminated by passing nitrogen through it. For subjecting it to a thermal treatment, the diisobutyl-aluminium isohexenyl solution was heated under reflux to 150° C. for 2 hours. 60 grams of a distillate (predominantly consisting of isobutylene) escaped over the intensely cooling reflux condenser and were condensed in a cooling trap at a temperature of −78° C.

EXAMPLE 2

Preparation of the titanium catalyst (a) With the use of heated diisobutyl-aluminium isohexenyl: 333 milliliters of a 25%-by-weight solution (0.333 mol) of diisobutyl-aluminium isohexenyl (Example 1) heated to 150° C. were added dropwise, while stirring and cooling, within an hour at 0° C. to a solution of 110 milliliters (1 mol) of titanium tetrachloride in 250 milliliters of a diesel oil fraction boiling from 150° to 160° C. Stirring was continued for another 2 hours at 0° C. and for 2 hours at room temperature and the catalyst suspension obtained was titrated with a 0.1 N-cerium sulfate solution; 1 milliliter ≅ 0.955 millimol.

(b) With the use of aluminium isoprenyl:
The reaction was carried out in a manner analogous to (a); 110 milliliters (1 mol) of titanium tetrachloride were added dropwise, while stirring and cooling, within an hour at 0° C., to a solution of 76 grams of aluminium isoprenyl (0.42 mol of aluminium) in 510 grams of diesel oil. Stirring was continued for 2 hours at 0° C. and for two hours at room temperature.

EXAMPLE 3

Polymerization of ethylene (a) With the use of heated diisobutyl-aluminium isohexenyl as activator: 100 liters of diesel oil boiling from 130° to 170° C. were introduced into a stirring autoclave of a capacity of 150 liters, air that was dissolved therein was eliminated by passing pure nitrogen through it, the dispersing agent was heated to 85° C. and saturated with ethylene, then hydrogen was fed in an amount such that its content in the gaseous phase amounted to 75% by volume. 200 millimols of diisobutyl-aluminium isohexenyl solution (of Example 1) which had been heated to 150° C. for 2 hours, and 30 millimols of the titanium catalyst prepared according to 2(b) were then added thereto. Subsequently, 5 kilograms per hour of ethylene and hydrogen corresponding to 70% by volume in the gaseous phase, were introduced within 7 hours at an internal temperature of 85° C. and while carefully stirring. The pressure in the autoclave rose from 3 to 7 atmosphere gage in the course of the polymerization. After cooling, filtration and drying, there were obtained 35 kilograms of polyethylene (corresponding to 1.16 kilograms per 1 millimol of $TiCl_3$) having a reduced specific viscosity of 1.5 (measured in a 0.1% decahydronaphthalene solution). The powder had an apparent density of 480 grams per liter at a density of 0.964 gram per cc. When the colorless polymer was subjected to a thermal treatment, for example by injecting molding, it showed no change in color at all nor a corrosion on the processing machines.

(b) With the use of aluminium triisobutyl as activator: The reaction was carried out in a manner analogous to Example 3(a), except that 200 millimols of aluminium triisobutyl was used as aluminium-organic compound. When 75% by volume of $H_2$ was present in the gaseous phase, a pressure of 7 atmospheres gage was already reached after 1.5 hours. Under the maximum pressure of 7 atmospheres gage the polymerization could be continued for another 2 hours while the inlet gas of an initial amount of 5 kilograms per hour decreased continuously, After a total period of 3.5 hours the polymerization was terminated. After cooling, filtration and drying, there were obtained 13 kilograms of a polymer having an apparent density of 450 grams per liter. The reduced specific viscosity was 1.9 (measured in a 0.1% decahydronaphthalene solution). The catalyst yield amounted therefore only to 0.43 kilogram per 1 millimol of $TiCl_3$ at a somewhat elevated molecular weight.

EXAMPLE 4

Reaction product of diisobutyl-aluminium hydride with acetylene 142 grams (1 mol) of diisobutyl-aluminium hydride were introduced into a three-necked flask having a capacity of 500 milliliters, provided with a gas inlet pipe, a thermometer, a stirrer and a nitrogen atmosphere. While vigorously stirring, 21.2 grams (0.82 mol) of acetylene were fed in at 65° C. within 13 hours. The sirupy reaction product was dissolved in 250 milliliters of diesel oil and washed with nitrogen to eliminate the unreacted acetylene. The thermal treatment was carried out by refluxing the product at 150° C. for 2 hours.

EXAMPLE 5

Preparation of diisohexyl-aluminium isooctenyl 142 grams (0.5 mol) of aluminium-tri-2-methylpentyl were introduced into a three-necked flask having a capacity of 500 milliliters, provided with a gas inlet pipe, a thermometer, a stirrer and a Dry-Ice reflux condenser. Within 12 hours, 13.2 grams of acetylene were introduced while stirring at 45° C. Prior to the use as polymerization activator, dissolved acetylene was eliminated by washing with nitrogen. For subjecting the reaction product to a thermal treatment, it was heated to 180° C. for 2 hours. In a cooling trap, 21.2 grams of a distillate escaped which predominantly consisted of 2-methylpentene-1.

EXAMPLE 6

Preparation of didecyl-aluminium dodecenyl

The reaction of 112.5 grams (0.25 mol) of aluminium tridecyl with 6.2 grams of acetylene required a reaction time of 14 hours at 60° C. The thermal treatment was carried out by heating the reaction product to 190° C. for 3 hours.

EXAMPLE 7

Polymerization of ethylene according to Table 1

In a stirring autoclave having a capacity of 2 liters, 1 liter of diesel oil (boiling range of from 150° to 160° C.) was washed with nitrogen to eliminate the air which was dissolved therein. The dispersing agent was heated to 85° C. 2 millimols (calculated on the aluminium) of the aluminium-organic compound disclosed under (a) to (m) in the table as well as 0.5 millimol of the titanium catalyst prepared in Example 2(b) were added thereto. After the nitrogen atmosphere had been eliminated by means of hydrogen, hydrogen was forced in under pressure until a total pressure of 3 atmospheres gage was reached. While continuously feeding in ethylene, the polymerization was then carried out at 85° C. for 2 to 2.5 hours under a total pressure of 6 atmospheres gage. The polymer formed was filtered off and dried. The melt index $i_5$ was determined according to ASTM D1238–62T.

EXAMPLE 8

Preparation of diisobutyl-aluminium pentinyl

Under an atmosphere of nitrogen, a solution of 161 milliliters (0.83 mol) of diisobutyl-aluminium monochloride in 100 milliliters of absolute hexane was added dropwise while stirring, at 55° C. within 45 minutes, to a suspension of 74.7 grams (0.83 mol) of pentine-sodium in 500 milliliters of absolute hexane. Stirring was continued at 60° C. for another hour and the sodium chloride precipitate was separated by centrifuging it under an atmosphere of nitrogen. The hexane was distilled off in vacuo and the chlorine-free residue of diisobutyl-aluminium pentinyl obtained was used as a polymerization activator.

EXAMPLE 9

Polymerization of ethylene according to the conditions disclosed in Example 7

(a) When aluminium triisobutyl was used, 140 grams of a polymer were obtained within 2 hours. The melt index $i_5$ was 0.8 and the apparent density was 270 grams per liter.

(b) When diisobutyl-aluminium pentinyl was used, 290 grams of a polyethylene having a melt index $i_5$ of 10 and an apparent density of 270 grams per liter, were obtained within 2 hours.

TABLE 1.—POLYMERIZATION OF ETHYLENE ACCORDING TO EXAMPLE 7

| Example No.: | Aluminium compound | Yield (grams) | Melt index $i_5$ (grams/ 10 min.) | Apparent density (grams/ liter) | Polymerization time (hours) |
|---|---|---|---|---|---|
| a | Aluminium triisobutyl | 175 | 0.9 | 300 | 2.5 |
| b | Diisobutyl-aluminium isohexenyl (Example 1) | 200 | 14 | 350 | 2.0 |
| c | Diisobutyl-aluminium isohexenyl (Example 1) heated | 250 | 20 | 370 | 2.0 |
| d | Aluminium-tri-2-methylpentyl | 180 | 1 | 250 | 2.0 |
| e | Diisohexyl-aluminium isooctenyl (Example 5) | 180 | 7 | 320 | 2.0 |
| f | Diisohexyl-aluminium isooctenyl (Example 5) heated | 270 | 7 | 380 | 2.0 |
| g | Aluminium tridecyl | 210 | 5 | 330 | 2.0 |
| h | Didecyl-aluminium dodecenyl (Example 6) | 230 | 7 | 340 | 2.0 |
| i | Didecyl-aluminium dodecenyl (Example 6) heated | 280 | 20 | 360 | 2.0 |
| k | Diisobutyl-aluminium hydride | 50 | 0.8 | 280 | 2.0 |
| l | Reaction product of diisobutyl-aluminium hydride with acetylene | 220 | 8.3 | 400 | 2.5 |
| m | Reaction product of diisobutyl-aluminium hydride with acetylene heated | 225 | 24 | 360 | 2.5 |

What is claimed is:

1. In the process for the homopolymerization of ethylene and copolymerization of ethylene with up to 10% by weight of a higher α-olefin in solution, suspension or gaseous phase, at temperatures of from 20° to 250° C. under a pressure of from 0 to 10 atmospheres gage, in the presence of a mixed catalyst consisting of as a trivalent chlorine-containing titanium compound, titanium chloride or titanium alkoxy chloride prepared by reducing a compound of the formula $Ti(OR)_{4-n}Cl_n$ wherein $n$ is an integer of from 1 to 4 and R is a hydrocarbon radical having from 2 to 8 carbon atoms with organic aluminum compounds at a temperature from −60 to +70° C. and at mol ratios of aluminum compound to titanium compound of 0.3 to 1.5, said trivalent chlorine-containing titanium compound being in a concentration of from 0.03 to 0.5 millimol per liter of dispersing agent or per 0.5 liter of reactor volume and an aluminum-organic component in a concentration of from 0.01 to 3 millimols of aluminum per liter of dispersing agent or reactor volume, while controlling the medium molecular weight with hydrogen, the improvement which comprises conducting the polyerization in the presence of a mixed catalyst, the aluminum-organic component of which has been prepared by thermal treatment of compounds of the formula $R_2Al—CH=CH—R$, wherein R stands for a hydrocarbon radical having from 2 to 10 carbon atoms at a temperature of from 140 to 180° C.

References Cited

UNITED STATES PATENTS

| | | | |
|---|---|---|---|
| 3,180,837 | 4/1965 | Bruce et al. | 252—429 |
| 3,296,237 | 1/1967 | Coen et al. | 260—93.5 |

FOREIGN PATENTS

| | | |
|---|---|---|
| 831,328 | 3/1960 | Great Britain. |
| 1,059,864 | 2/1967 | Great Britain. |
| 1,446,624 | 6/1966 | France. |
| 1,358,111 | 3/1964 | France. |

JOSEPH L. SCHOFER, Primary Examiner
EDWARD J. SMITH, Assistant Examiner

U.S. Cl. X.R.

252—429; 260—94.9